United States Patent

Wang

(10) Patent No.: US 12,342,193 B2
(45) Date of Patent: Jun. 24, 2025

(54) UWB RANGING PERFORMANCE TESTING METHOD, SYSTEM, DEVICE AND STORAGE MEDIUM

(71) Applicant: Beijing Xiaomi Mobile Software Co., Ltd., Beijing (CN)

(72) Inventor: Feng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 646 days.

(21) Appl. No.: 17/681,313

(22) Filed: Feb. 25, 2022

(65) Prior Publication Data

US 2023/0127414 A1    Apr. 27, 2023

(30) Foreign Application Priority Data

Oct. 26, 2021  (CN) .......................... 202111248623.7

(51) Int. Cl.
   *H04W 24/08* (2009.01)
   *H04B 17/27* (2015.01)
   *H04W 4/02* (2018.01)
   *H04W 72/0446* (2023.01)

(52) U.S. Cl.
   CPC .......... *H04W 24/08* (2013.01); *H04W 4/023* (2013.01); *H04W 72/0446* (2013.01); *H04B 17/27* (2015.01)

(58) Field of Classification Search
   CPC . H04W 24/08; H04W 4/023; H04W 72/0446; H04B 17/27; H04B 17/15; G01S 11/02
   See application file for complete search history.

(56) References Cited

U.S. PATENT DOCUMENTS

| | | | |
|---|---|---|---|
| 10,495,737 B1 | 12/2019 | Torborg | |
| 2005/0235263 A1* | 10/2005 | Bundy | G06F 11/263 717/124 |
| 2011/0037857 A1* | 2/2011 | Chen | H04N 17/04 348/180 |
| 2019/0213362 A1 | 7/2019 | Lee et al. | |
| 2020/0389763 A1* | 12/2020 | Yoon | G01S 13/765 |
| 2021/0072373 A1 | 3/2021 | Schoenberg et al. | |
| 2021/0136556 A1 | 5/2021 | Lee et al. | |

(Continued)

FOREIGN PATENT DOCUMENTS

| | | | |
|---|---|---|---|
| CN | 101064963 A | 10/2007 | |
| CN | 102238608 A | 11/2011 | |

(Continued)

OTHER PUBLICATIONS

Extended European Search Report dated Aug. 26, 2022 for European Patent Application No. 22158981.5.

*Primary Examiner* — Oussama Roudani
(74) *Attorney, Agent, or Firm* — Volpe Koenig

(57) ABSTRACT

A UWB ranging performance testing method is disclosed in which a control terminal device sends a test request signal message to multiple devices to be tested. The test request signal message includes communication time slots distributed by the control terminal device to multiple devices to be tested. Communication time slots of different devices to be tested are different. All devices to be tested return the response signal message for UWB ranging performance testing in their respective corresponding communication time slots.

11 Claims, 8 Drawing Sheets

(56) References Cited

U.S. PATENT DOCUMENTS

| | | | |
|---|---|---|---|
| 2023/0106567 A1* | 4/2023 | Barton | G01S 5/0236 455/456.1 |
| 2023/0184916 A1* | 6/2023 | Pirch | H04B 17/3912 342/22 |
| 2024/0098677 A1* | 3/2024 | Takeda | G01S 13/765 |

FOREIGN PATENT DOCUMENTS

| | | |
|---|---|---|
| CN | 111693821 A | 9/2020 |
| CN | 112654088 A | 4/2021 |

* cited by examiner

UWB RANGING PERFORMANCE TESTING METHOD, SYSTEM, DEVICE AND STORAGE MEDIUM

CROSS-REFERENCE TO RELATED APPLICATION

The present application claims the benefit of priority to Chinese Patent Application No. 202111248623.7, filed on Oct. 26, 2021. The contents of the above-listed application are hereby incorporated by reference for all purposes.

BACKGROUND

Ranging using Ultra Wide Band (UWB) technology determines a distance between two devices based on the Time of Flight (ToF) of a signal between the two devices. To ensure the accuracy of ranging based on UWB, a UWB ranging performance test needs to be performed on a device that will support UWB technology.

SUMMARY

The disclosure relates to the technical field of UWB radio communications, and in particular to a UWB ranging performance testing method, system, device and a storage medium. The disclosure provides a UWB ranging performance testing method, system, device and a storage medium.

According to a first aspect of an example of the disclosure, a UWB ranging performance testing method is provided and performed by a control terminal device. The UWB ranging performance testing method includes: sending a test request signal message to a plurality of devices to be tested, the test request signal message comprising a communication time slot distributed by the control terminal device for the plurality of devices to be tested. Each respective device to be tested corresponds to a different, respective time slot. The method includes receiving a response signal message returned from each of the plurality of devices to be tested in respective corresponding communication time slots. The response signal message is used for UWB ranging performance testing.

According to a second aspect of the example of the disclosure, a UWB ranging performance testing method is provided, and performed by a device to be tested. The UWB ranging performance testing method includes receiving a test request signal message. The test request signal message includes a communication time slot distributed by a control terminal device that distributes communication time slots to a plurality of devices to be tested. Different respective devices to be tested have different corresponding communication time slots. Based on the test request signal message, the method includes determining by the device, a communication time slot for returning a test response signal message to the control terminal device. The test response signal message is used for UWB ranging performance testing. In accordance with the communication time slot for the current device to be tested to return the test response signal message to the control terminal device, the method includes sending the test response signal message to the control terminal device.

According to a third aspect of the example of the disclosure, a UWB ranging performance testing system is provided. The UWB ranging performance testing system includes a control terminal device and a test board. The test board is used to hold a plurality of devices to be tested. The control terminal device is configured to send a test request signal message to the plurality of devices to be tested. The test request signal message includes communication time slots distributed by the control terminal device to the plurality of devices to be tested. Different devices to be tested have different communication time slots.

The devices to be tested receive a test request signal message. The devices to be tested are configured to determine, based on the test request signal message, a communication time slot in which to return a test response signal message to the control terminal device. The test response signal message is used for UWB ranging performance testing. The devices to be tested are configured to send a test response signal message to the control terminal device in accordance with the communication time slot for returning the test response signal message to the control terminal device. The control terminal device receives the response signal message returned by the multiple devices to be tested in their respective corresponding communication time slots.

According to a fourth aspect of the example of the disclosure, an electronic device is provided including a processor and a memory for storing processor executable instructions. The processor is configured to execute the processor executable instructions whereby the processor is configured to carry out the UWB ranging performance testing method in the first aspect.

According to a fifth aspect of the example of the disclosure, an electronic device is provided including a processor and a memory for storing processor executable instructions. The processor is configured to execute the processor executable instructions, whereby the processor is configured to UWB ranging performance testing method in the second aspect.

According to a sixth of the example of the disclosure, a non-transitory storage medium is provided. The non-transitory storage medium stores processor-executable instructions. When the instructions in the storage medium are executed by a processor of a control terminal device, the control terminal device is configured to execute the UWB ranging performance testing method of the first aspect.

According to a seventh aspect of the example of the disclosure, a non-transitory storage medium is provided. The non-transitory storage medium stores processor-executable instructions. When the processor-executable instructions in the storage medium are executed by a processor of a control terminal device, the control terminal device is configured to execute the UWB ranging performance testing method in the second aspect.

It shall be understood that the above general description and the following detailed description are only exemplary and explanatory, and are not intended to limit the disclosure.

BRIEF DESCRIPTION OF THE FIGURES

The accompanying figures herein are incorporated into the specification and constitute a part of the specification, to show examples consistent with the disclosure, and to explain the principle of the disclosure together with the specification.

DETAILED DESCRIPTION OF THE EXAMPLES

Examples will be described in detail herein and shown in the accompanying figures. When the following description refers to the figures, the same numbers in different figures indicate the same or similar elements, unless otherwise indicated. The various implementations of the examples described herein do not represent all possible implementations consistent with the disclosure. Instead, they are merely examples of implementations of apparatuses and methods consistent with some aspects of the disclosure described herein and detailed in the appended claims.

UWB technology is a wireless communication technology which transmits signals in a pulse mode. Compared with wireless communication technologies using continuous carrier modulation, such as WiFi, Bluetooth and Zigbee, UWB technology is characterized by high bandwidth, high signal-to-noise ratio, strong anti-interference capability, etc. At present, the technology is widely applied to fields such as smart home, data transmission, digital encryption key and real-time positioning.

Ranging using Ultra Wide Band (UWB) technology generally determines a distance between two devices based on the Time of Flight (ToF) of a signal between the two devices. To ensure the accuracy of UWB ranging determinations, a UWB ranging performance test needs to be performed on a device that will be deployed to support UWB technology. In the related art, each test ensures that only one device to be tested interacts with a control terminal device, resulting in a low testing efficiency.

Figure 1:
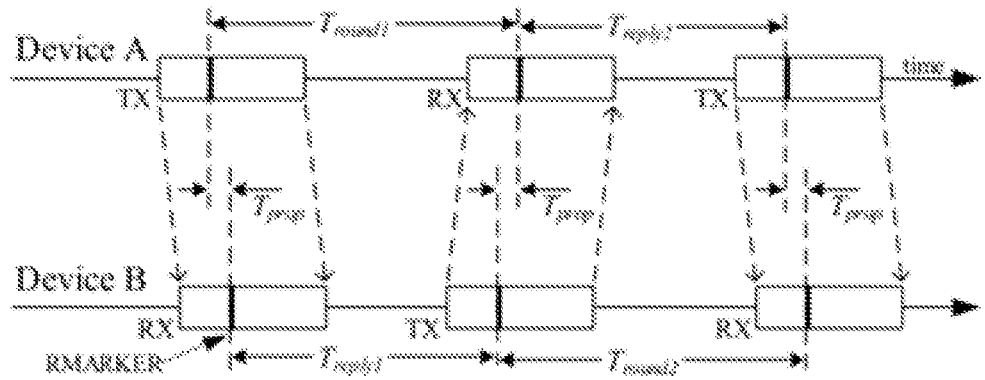
FIG. 1 is a schematic diagram of a Double Side, Two-way Ranging mode according to an exemplary example.

In a scenario using UWB technology, the advantage of high accuracy of UWB technology in ranging and angle measurement is leveraged to measure the distance between two devices. Multiple ranging solutions based on UWB technology are provided. For example, a Double Side, Two-way Ranging (DS-TWR) mode is commonly used in point-to-point ranging applications. FIG. 1 is a schematic diagram of a Double Side, Two-way Ranging mode according to an example. As shown in FIG. 1, four parameters, Tround1, Tround2, Treply1 and Treply2, are obtained through three rounds of interaction between two devices. A Tprop time, that is, ToF, can be calculated with the above four parameters by the formula below. According to ToF and speed of light, a distance value between two devices is obtained.

$$\hat{T}_{prop} = \frac{T_{round1} \times T_{round2} - T_{reply1} \times T_{reply2}}{T_{round1} + T_{round2} + T_{reply1} + T_{reply2}}$$

In the formula, Tprop is the time of flight of a signal between two devices. Tround1 is a time difference of a device A from sending a ranging signal to receiving a response ranging signal. Treply1 is a time difference of a device B from receiving a ranging signal to sending a response ranging signal. Tround2 is a time difference of the device B from sending a response ranging signal to receiving a ranging final signal. Treply2 is a time difference of the device A from a time of receiving a response ranging signal to a time sending a ranging final signal.

Figure 2:
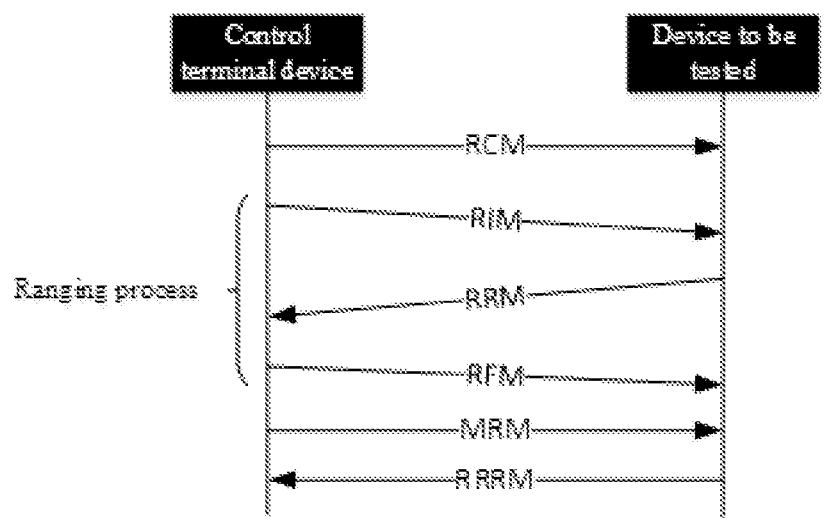
FIG. 2 is a flowchart of interaction of UWB in the ranging process according to an exemplary example.

In a technical application of UWB, to better promote development of the UWB technology, regulations and agreements for UWB technology applications are formulated. The role and processes for UWB ranging are specified in the regulations and agreements for UWB technology applications. FIG. 2 is a flowchart of interaction between a control terminal device and a device to be tested in an example of an UWB ranging process. As shown in FIG. 2, the whole ranging process includes three rounds during which interaction messages are exchanged as shown in FIG. 1. The messages are namely, a Ranging Initiation Message (RIM), a Ranging Response Message (RRM) and a Ranging Final Message (RFM). A Ranging Control Message (RCM), a Measurement Report Message (MRM) and a Ranging Result Report Message (RRRM).

An RCM is initiated by a control terminal device, and is used to broadcast the address of a device to be tested for ranging. The control terminal device informs the device to be tested of Tround1 and Treply2 acquired at the control terminal device through the MRM. The device to be tested feeds back a finally calculated ToF value to the control terminal device through the RRRM. The control terminal device determines the distance between the control terminal device and the device to be tested based on the ToF value.

Figure 3:
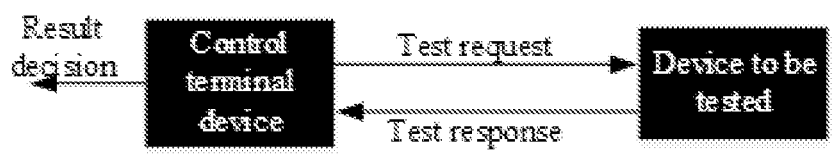
FIG. 3 is a flowchart of a universal testing method according to an exemplary example.

FIG. 3 is a flowchart of a method according to an example. As shown in FIG. 3, in the related art, when the device to be tested is tested, each test ensures that only one device to be tested interacts with the control terminal device. A final testing result is decided by the control terminal device and the testing result is output. The qualification decision is based on a comparison of the relationship between a distance error of a calculated distance value, an actual distance value and a threshold. If the distance error is greater than or equal to the threshold, the testing result is unacceptable and the device to be tested is determined unqualified. If the distance error is smaller than the threshold, the testing result is acceptable and the device to be tested is determined qualified.

It can be seen that at least one of the following problems may arise when the testing method is applied to testing of a UWB device. First, multiple devices to be tested affect each other when tested simultaneously. Since a common channel is used in UWB ranging, all devices to be tested can receive signals from a control terminal, resulting in inaccurate testing results due to interference between multiple devices when tested simultaneously. Second, to acquire the address of the device to be tested, extra devices and processes need to be added. For example, the control terminal device needs to know the address of the device to be tested in the UWB ranging process, and the address of the device to be tested needs to be acquired through a non-UWB channel, such as Bluetooth, WiFi or Near Field Communication (NFC).

Third, testing is performed in a one-to-one mode, resulting in a low testing efficiency. It can be understood that when ranging is performed with UWB, to ensure the accuracy of the ranging result, multiple rounds of ranging are generally performed. Performing multiple rounds of ranging results in an increase in ranging time of a single device to be tested.

In other words, a root cause of the above problems may be understood as that of a universal testing method that is applicable to a testing scenario with one control terminal device corresponding to only one device to be tested. There is no accommodation in the related art for a testing scenario in which one control terminal device corresponds to multiple devices to be tested.

In view of this drawback of the related art, an example of the disclosure provides a UWB ranging performance testing method. A control terminal device sends a test request signal message to multiple devices to be tested. The test request signal message includes communication time slots distributed by the control terminal device to multiple devices to be tested. Different communication time slots correspond to different devices to be tested. All devices to be tested return the response signal message for UWB ranging performance testing in their respective corresponding communication time slots. Different communication time slots for feeding back the response signal message are distributed to each of the different devices to be tested. This avoids mutual influence of different response signal messages should multiple devices to be tested synchronously send their response signal messages to the control terminal device. The examples described in this disclosure are capable of achieving synchronous interaction of one control terminal device with multiple devices to be tested for UWB ranging performance testing, thereby improving the testing efficiency.

In an example of the disclosure, to simplify testing processes, a test board for holding one or more devices to be tested is provided. The test board places each device in a fixed positional relationship with the control terminal device. The test board has multiple test board calibrated positions, and the device to be tested is placed on the test board calibrated position when tested. For ease of discussion, the disclosure describes an arc-shaped test board as example for purposes of describing the relationship between the test board, the control terminal device, and the device to be tested.

Figure 4:
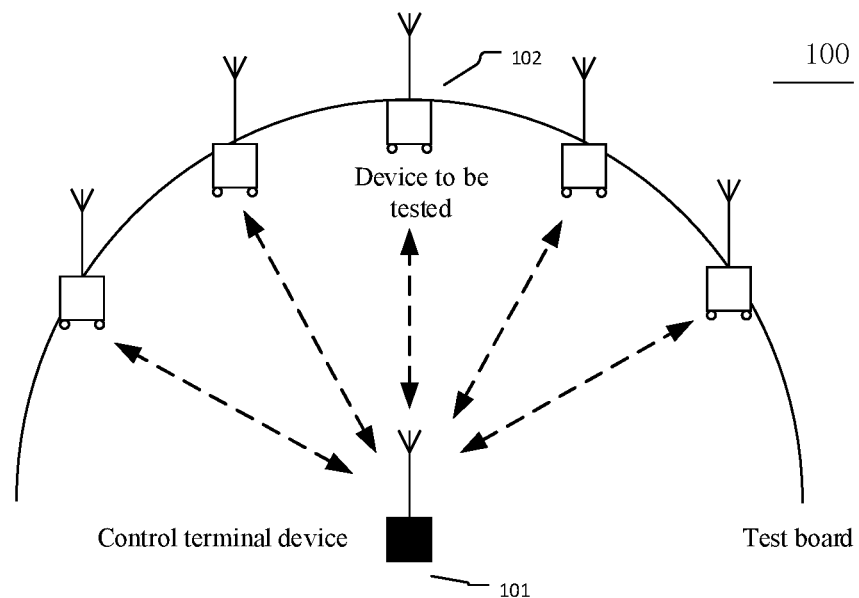
FIG. 4 is a schematic diagram of the relationship between a test board, a control terminal device and a device to be tested according to an exemplary example.

FIG. 4 is a schematic diagram of the relationship between a test board, a control terminal device and a device to be tested according to an example. As shown in FIG. 4, a device to be tested 102 is placed on a test board at a calibrated position. The test board is arc-shaped and the devices are arranged such that an actual distance between each device to be tested 102 and a control terminal device 101 is the same for each device to be tested. This arrangement is convenient for determining testing results. However, the disclosure does not limit the shape of the test board itself, as long as the actual distance between each test board calibrated position on the test board and the control terminal device is known in the testing. For example, the test board may also take an elongate or linear shape, that is, the test board calibrated positions are disposed in a line on the test board. The actual distance between each test board calibrated position and the control terminal device is determined in advance, to facilitate determination of a testing result. The number of the test board calibrated positions on the test board is determined according to actual needs.

The implementation of the disclosure is applicable to in-batch testing of UWB ranging performance of the devices to be tested. In a scenario 100 shown in FIG. 4, one test board calibrated position corresponds to one fixed test board address, and the control terminal device 101 also has a fixed address. The control terminal device 101 adds the test board address to a device list. Each device to be tested (one example indicated at 102) is placed on the test board at a corresponding calibrated position. The test board address of a test board calibrated position at which a device to be tested is placed, is input into the device to be tested 102. In UWB ranging performance testing the test board address represents the device to be tested 102, in the position in which it is placed on the test board. In the UWB ranging performance testing process, the test board address may also be understood as corresponding to the address of the device to be tested 102.

The control terminal device 101 distributes communication time slots to multiple devices to be tested according to their respective, corresponding test board addresses. A test request signal message including the communication time slot is sent to each device to be tested 102. Each device to be tested 102 feeds back a response signal to the control terminal device 101 in accordance with a different communication time slot.

Figure 5:
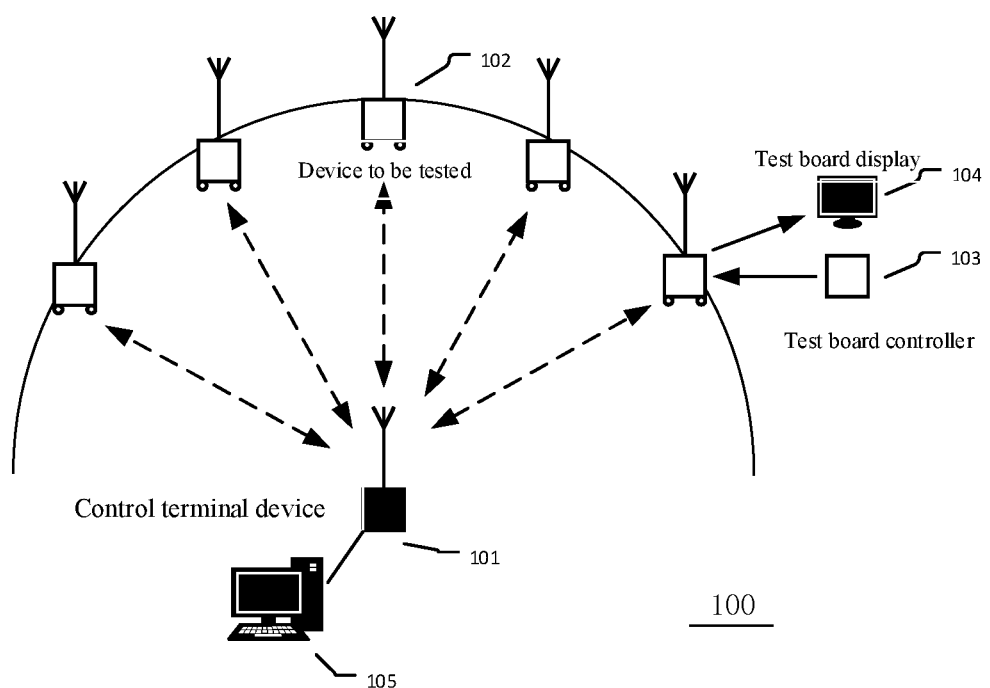
FIG. 5 is a schematic diagram of a UWB ranging performance testing scene according to an exemplary example.

FIG. 5 is a schematic diagram of a UWB ranging performance testing scenario according to an example. In a UWB ranging performance testing scenario as shown in FIG. 5, the device to be tested 102 is controlled by a test board controller 103. The test board address of a test board calibrated position at which a device 102 to be tested is currently placed, is sent to the device to be tested 102 through the test board controller 103. The disclosure does not limit the corresponding relationship or interaction mode of the test board controller 103 and the test board calibrated positions, which may be one to one, or one to multiple.

The test board controller 103 controls the on and off function of a UWB device to be tested 102. The test board controller 103 may be one of a variety of suitable devices such as an infrared remote controller, a serial device, an NFC card and a Bluetooth device. A test board display device 104 is used to display a ranging result and/or testing result of the device to be tested 102. The ranging result and testing result of test board display device 104 are provided by the device to be tested 102. The test board display device 104 may be one of a variety of suitable devices such as a display screen, a digital tube, an indicator and a buzzer as auxiliary devices of the device 102 to be tested. A smart device 105 is used to set parameters of the control terminal device 101 or to control the on and off function of the UWB device. The smart device 105 may be a PC, a PAD or any other smart device capable of completing setting functions.

It can be seen that in testing using the UWB ranging performance testing method provided by the example of the disclosure, the control terminal device 101 uses a fixed address. The device to be tested 102 inputs a test board address of a current test board calibrated position which is one of a plurality of different test board calibrated positions. Different communication time slots are distributed for different devices to be tested 102 according to different test board addresses in the devices to be tested 102. Communication of the control terminal device 101 with the device to be tested 102 at different time slots is supported, that is, a mode of one to multiple may be employed. When the UWB ranging process is performed, an RCM, a RIM, an RFM and an MRM sent from the control terminal device can be shared, to shorten the testing time.

Figure 6:
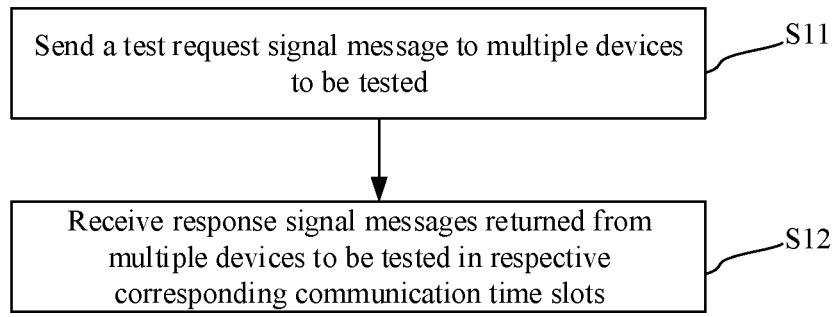
FIG. 6 is a flowchart of a UWB ranging performance testing method applied to a control terminal device according to an exemplary example.

The following example will describe, with reference to the accompanying figures, the UWB ranging performance testing method provided by the disclosure and applied to the control terminal device. FIG. 6 is a flowchart of a UWB ranging performance testing method applied to a control terminal device according to an example. As shown in FIG. 6, the UWB ranging performance testing method is applied to a control terminal device. The method includes the following steps.

In step S11, a test request signal message is sent to multiple devices to be tested. In the example of the disclosure, the test request signal message includes a communication time slot distributed by the control terminal device to the multiple devices to be tested. The communication time slots of different devices to be tested are different. In the UWB ranging performance testing process, communication time slots can be distributed in real time to multiple devices to be tested in each testing. Alternatively, communication time slots can be distributed in advance of testing.

In the example of the disclosure, the test request signal message includes: a ranging control message, a ranging initiation message, a ranging final message and a ranging report message. The ranging control message includes communication time slots to be distributed to multiple devices to be tested. In one example, a test request signal message may be sent to multiple devices to be tested in a broadcasting mode. In yet another example, the test request signal message may be sent to multiple devices to be tested in a single wave mode. In step S12, response signal messages returned from multiple devices to be tested in respective corresponding communication time slots are received. In the example of the disclosure, the response signal message is used for UWB ranging performance testing.

In the example of the disclosure, the test request signal message is sent to multiple devices to be tested by the following process. Multiple test board addresses corresponding to positions on the test board at which the device to be tested are held, are determined. A corresponding relationship between each test board address and a corresponding communication time slot is created. Different test board addresses correspond to different communication time slots. The test request signal message including the corresponding relationship is sent to the device to be tested. The device to be tested is placed on the test board at one of the positions on the test board, and the test board address is input. In the example of the disclosure, a different test board address is set for each device to be tested, to ensure that multiple devices to be tested do not affect each other when tested synchronously.

In one implementation mode, the test board address of the device to be tested is an address in a set of addresses managed by the control terminal device. An example of the disclosure adopts fixed test board addresses. The control terminal device is capable of directly determining the test board address of the device to be tested without acquiring it through a non-UWB channel. Thus, the testing process is simplified.

For example, the control terminal device adds the test board address corresponding to the device to be tested into a device list. For example, the device list includes 8 fixed test board addresses, {0x0001, 0x0002, 0x0003, 0x0004, 0x0005, 0x0006, 0x0007 and 0x00008}, where the 8 test board addresses respectively correspond to 8 test board calibrated positions. Different devices to be tested are distinguished according to their test board addresses. According to the test board address of the device to be tested, a corresponding relationship between the test board address and a communication time slot is created, such that different test board addresses correspond to different communication time slots.

The disclosure is not limited with respect to whether UWB ranging performance testing is determined in the control terminal device or in the device to be tested. According to actual needs, it may be determined that a UWB ranging performance test result is determined in the control terminal device. In other circumstances the UWB ranging performance testing result may be determined in the device to be tested. The method for determining the UWB ranging performance testing result in the control terminal device is essentially the same as the method for determining the UWB ranging performance testing result in the device to be tested.

When the testing result is determined in the control terminal device, based on the response signal message, a distance between the device to be tested and the control terminal device is determined. Based on the distance between the device to be tested and the control terminal device, and the distance threshold, the testing result is determined. The response signal message includes an RRM and an RRRM. The RRRM is used for sending a finally calculated ToF value to the control terminal device.

The control terminal device determines a calculated distance between the control terminal device and the device to be tested based on the ToF value in the RRRM. A distance error is determined according to the calculated distance between the control terminal device and the device to be tested and an actual distance between the control terminal device and the device to be tested. If a distance error is greater than or equal to a distance threshold, the UWB ranging performance of the device to be tested is unacceptable and the device is determined to be unqualified. If the distance error is smaller than the distance threshold, the UWB ranging performance of the device to be tested is determined acceptable and the device is determined to be qualified.

Figure 7:
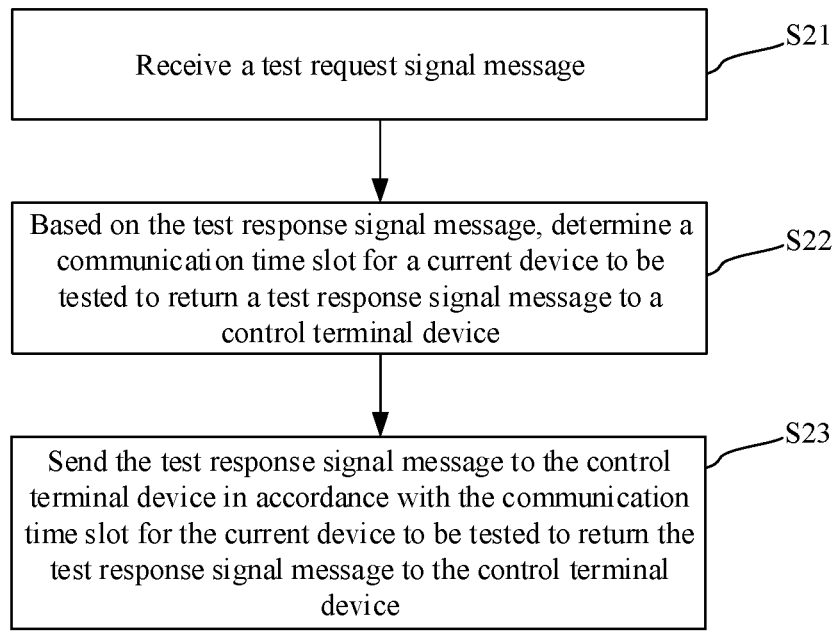
FIG. 7 is a flowchart of a UWB ranging performance testing method applied to a device to be tested according to an exemplary example.

The following example will describe, in conjunction with the accompanying figures, the UWB ranging performance testing method provided by the disclosure and applied to the device to be tested. FIG. 7 is a flowchart of a UWB ranging performance testing method applied to a device to be tested according to an example. As shown in FIG. 7, the UWB ranging performance testing method includes the following steps.

In step S21, a test request signal message is received. In the example of the disclosure, the test request signal message includes a communication time slot distributed by the control terminal device for multiple devices to be tested, and communication time slots of different devices to be tested are different. For example, the test request signal message includes a corresponding relationship between a test board address and a communication time slot.

In the example of the disclosure, the communication time slot for a current device to be tested to return the test response signal message to the control terminal device is determined by step S211 to step S213. In step S211, the test board address at which the current device to be tested is placed is determined. For example, test board addresses respectively corresponding to 8 test board calibrated positions include: {0x0001, 0x0002, 0x0003, 0x0004, 0x0005, 0x0006, 0x0007, 0x00008}. A test board address corresponding to a current test board calibrated position at which a device to be tested is placed on the test board, may be written into the device to be tested through a test board controller. In step S212, based on the corresponding relationship, a communication time slot corresponding to the test board address where the current device to be tested is placed is determined.

Following the above example, the corresponding relationship between the test board address and the communication time slot includes: a 0x0001 corresponds to a communication time slot 1, 0x0002 corresponds to a communication time slot 2, 0x0003 corresponds to a communication time slot 4, etc. In the device to be tested, the test board address where the current device to be tested is placed is known, and a communication time slot corresponding to the test board address where the current device to be tested is placed is determined.

In step S213, the communication time slot corresponding to the test board address where the current device to be tested is placed is taken as a communication time slot for feeding back the test response signal message to the control terminal device. In step S22, based on the test response signal message, a communication time slot for the current device to be tested to return the test response signal message to the control terminal device is determined. The test response signal message is used for UWB ranging performance testing. In step S23, the test response signal message is sent to the control terminal device in accordance with the communication time slot for the current device to be tested to return the test response signal message to the control terminal device.

In the example of the disclosure, the testing result is determined in the device to be tested. The response signal message includes the ranging response message RRM. When the testing result is determined at the device to be tested, based on the ranging report message in the test request signal message, a distance between the device to be tested and the control terminal device is determined. Based on the distance between the current device to be tested, the control terminal device, and the distance threshold, the testing result is determined.

Compared with the he testing mode of one to one adopted in the related art, the disclosure adopts the testing mode that the testing time can be saved. In the case that the maximum number of the devices to be tested is 8, within a fixed ranging cycle, the number of devices to be tested participating in testing of the disclosure is 8 times the number of devices tested in the testing mode of one to one. In addition, by using the UWB ranging performance testing method provided by the disclosure, in a ranging mode of one to multiple, the ranging process can share the RCM, the RIM, the RFM and the RRM broadcast by the control terminal device, to save more time in the testing process.

Based on the same general approach described above, examples of the disclosure further provide a UWB ranging performance testing system. The UWB ranging performance testing system includes a control terminal device and a test board. The test board is used to hold multiple devices to be tested.

Figure 8:
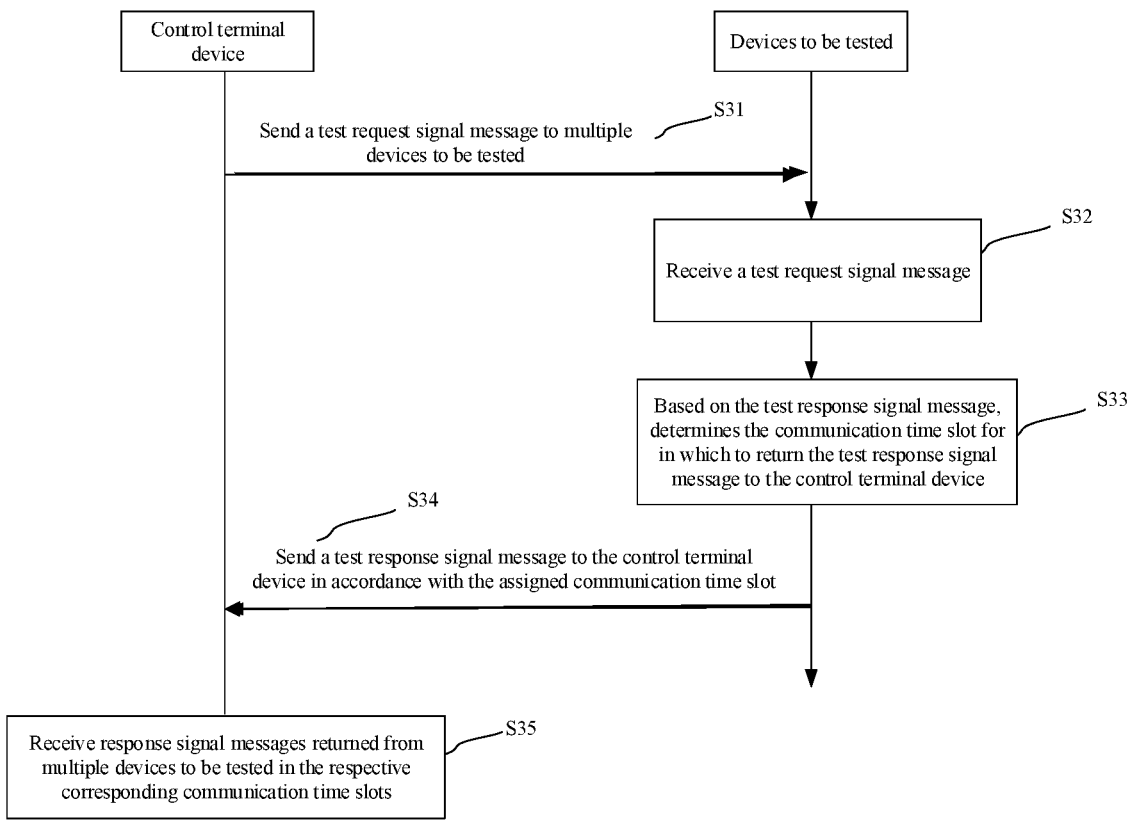
FIG. 8 is a flowchart of a UWB ranging performance testing system according to an exemplary example.

The following example will describe, in conjunction with the accompanying figure, a process of UWB ranging performance testing including interaction between the control terminal device and the device to be tested. FIG. 8 is a flowchart of a UWB ranging performance testing system according to an example. As shown in FIG. 8, the process of UWB ranging performance testing comprises interactions between a control terminal device and a device to be tested, and includes the following steps.

In step S31, the control terminal device sends a test request signal message to multiple devices to be tested. The test request signal message includes a communication time slot distributed by the control terminal device for multiple devices to be tested, and communication time slots of different devices to be tested are different.

In step S32, the devices to be tested receive the test request signal message. In step S33, the devices to be tested, based on the test request signal message, determine the communication time slot for the current device to be tested to return the test response signal message to the control terminal device. The test response signal message is used for UWB ranging performance testing. In step S34, the devices to be tested send the test response signal message to the control terminal device in accordance with the communication time slot for the current device to be tested to return the test response signal message to the control terminal device. In step S35, the control terminal device receives response signal message returned from multiple devices to be tested in respective corresponding communication time slots.

Figure 9:
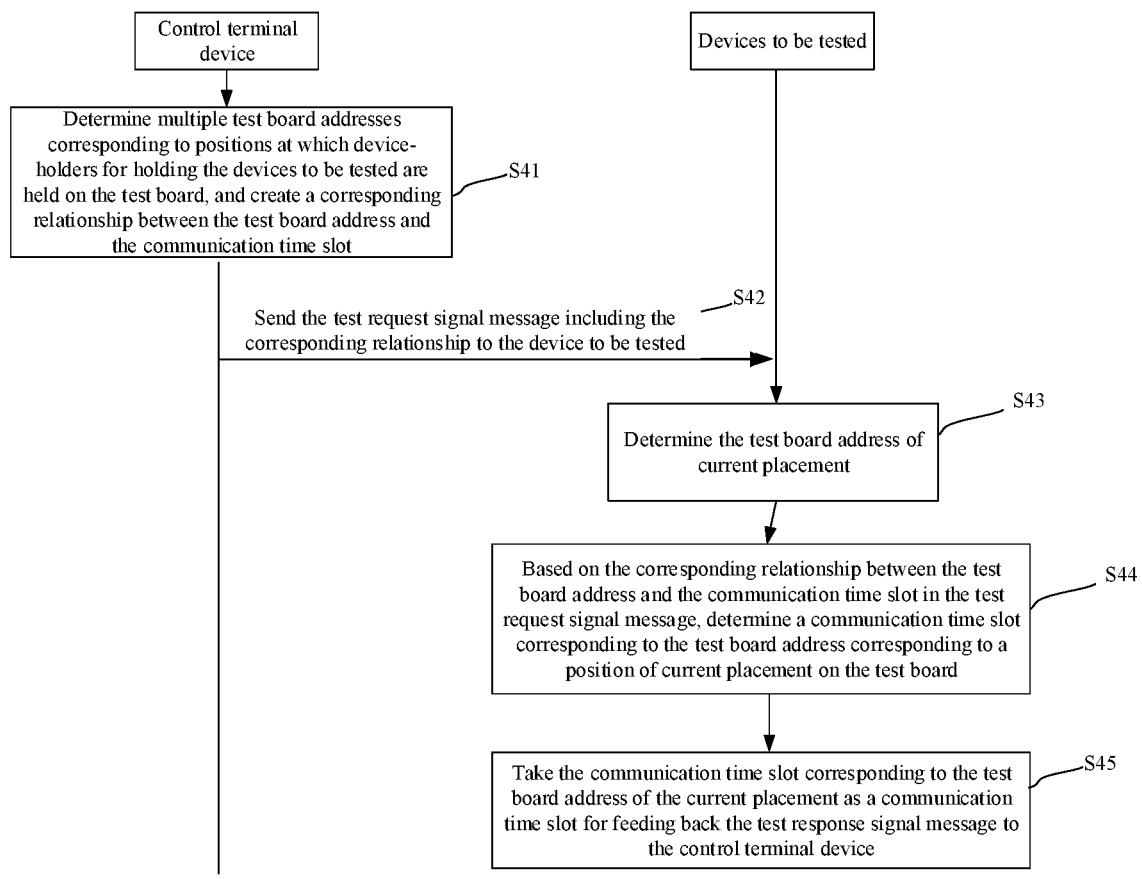
FIG. 9 is a flowchart of interaction performed according to a communication time slot determined by a test board address according to an exemplary example.

In the example of the disclosure, the interaction between the control terminal device and the device to be tested proceeds according to a communication time slot determined by the test board address. This is described with reference to FIG. 9. FIG. 9 is a flowchart of interactions that proceed according to a communication time slot determined according to a test board address according to an example. As shown in FIG. 9, a control terminal device interacts with a device to be tested according to a communication time slot determined by a test board address.

In step S41, the control terminal device determines multiple test board addresses corresponding to positions at which device-holders for holding the devices to be tested are held on the test board, and create a corresponding relationship between the test board address and the communication time slot. Different test board addresses correspond to different communication time slots.

In step S42, the control terminal device sends a test request signal message including the corresponding relationship to the device placed on test board to be tested and input with the corresponding test board address.

In step S43, the device to be tested determines the test board address of current device placed on the test board and being tested.

In step S44, the device to be tested, based on the corresponding relationship between the test board address and the communication time slot in the test request signal message, determines a communication time slot corresponding to the test board address of device as it is currently in place on the test board. In step S45, the communication time slot corresponding to the test board address of current placement is taken as the communication time slot for feeding back the test response signal message to the control terminal device.

Figure 10:
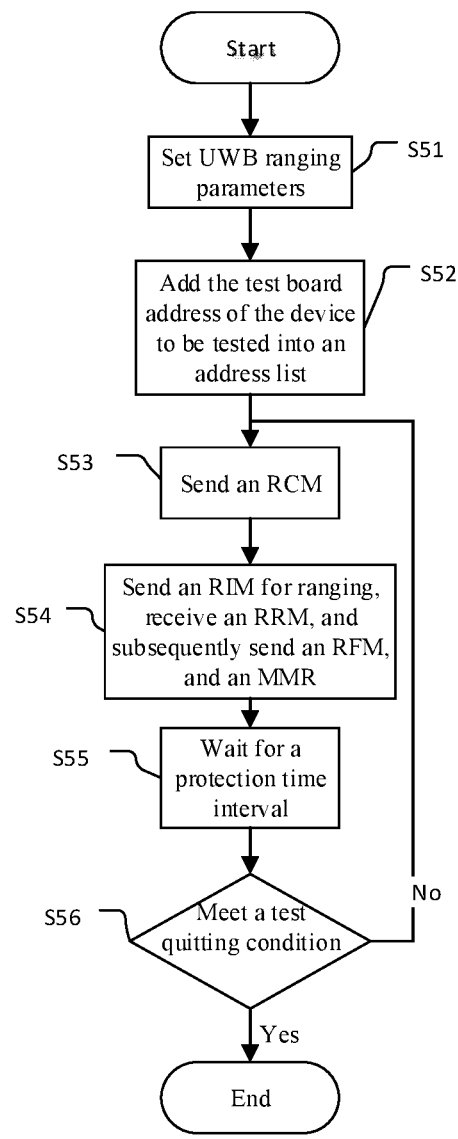
FIG. 10 is an operation flowchart of a control terminal device according to an exemplary example.
Figure 11:
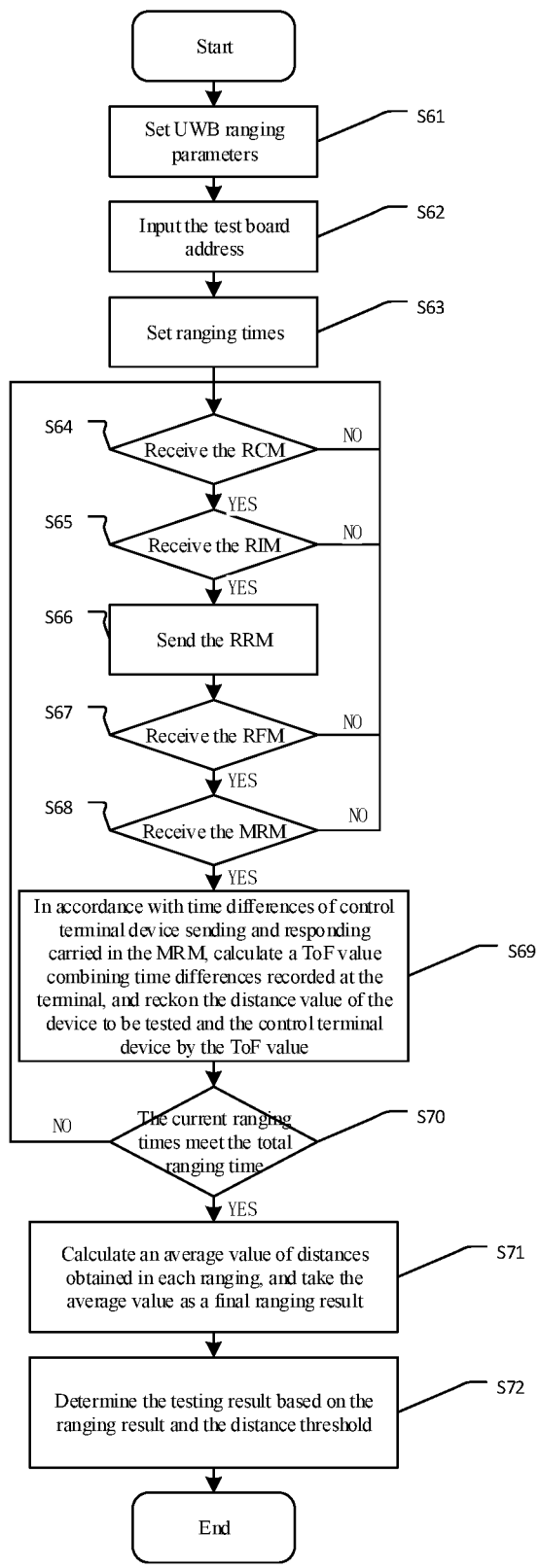
FIG. 11 is an operation flowchart of a device to be tested according to an exemplary example.

The following example, in conjunction with the accompanying figures, will describe operations of the control terminal device and the device to be tested in a UWB ranging performance testing process. FIG. 10 is an operation flowchart of a control terminal device according to an exemplary example. FIG. 11 is an operation flowchart of a device to be tested according to an exemplary example.

As shown in FIG. 10, after the control terminal device is powered on in step S51, UWB ranging parameters are set. The UWB ranging parameters include a UWB communication channel, a ranging mode, a ranging cycle, etc. The ranging mode may be set as either one to one, or one to many. In a 'one to one' mode, one control terminal device corresponds to one device to be tested. In a 'one to many' mode, one control terminal device corresponds to multiple devices to be tested. The ranging mode set by the instant example is 'one to many', i.e., one control terminal device corresponds to multiple devices to be tested.

In step S52, the test board address of the device to be tested is added into the address list. The control terminal device turns on a ranging function, and in step S53, sends an RCM. The RCM contains the test board address added in S52, and the communication time slot corresponding to each test board address. The RCM is sent through a broadcast message so that each device to be tested can know its respective communication time slot after receiving the RCM, and can communicate with the control terminal device in accordance with the specified communication time slot.

In the interaction between the control terminal device and the device to be tested in the ranging performance testing process, in step S54, a RIM for ranging is sent. An RRM is received, and then an RFM is sent, as well as an MMR. In step S55, there is a wait for a protection time interval. The protection time interval is imposed between every two rounds of ranging, to allow time to complete processing on testing data. In step S56, a determination is made as to whether a test quitting condition is met. For example, if the control terminal device receives a test quitting instruction, it quits the ranging process. The test quitting instruction may be sent from a smart device 105. If the test quitting instruction is not received, the method proceeds to a next ranging process, and the control terminal device is in a reiterating ranging process.

It can be seen from the above example that the disclosure omits the process of setting addresses and parameters of the device to be tested in other modes. UWB communication parameters and communication addresses are both fixed values specified in advance. No external carrying mode (non-UWB communication mode) is needed to specify the parameters and addresses, thus reducing the cost.

By using the UWB ranging performance testing method provided by the disclosure, the device to be tested can be accessed at any time convenient and the test is rapid to operate. The control terminal device is capable of distributing the communication time slot for each test board address in each testing, and does not need to determine whether the device to be tested is placed on the test board. Therefore, the device to be tested can be accessed to test at any time.

In the UWB ranging performance test process of the control terminal device shown in FIG. 10, the control terminal device is set to start the ranging process and perform iterations of the process. Each iteration, or round, of ranging starts from the RCM. A ranging result is decided in the device to be tested.

In the UWB ranging performance testing process of the device to be tested in FIG. 11, after the device to be tested is powered on, UWB ranging parameters identical to the control terminal device are set. When the RCM is received and the device is accessed for the ranging process, no extra synchronous operation is needed.

As shown in FIG. 11, the device to be tested is powered on, and in step S61, UWB ranging parameters are set. The set UWB ranging parameters are set accordance with the control terminal device. In step S62, the test board address is input. The test board address may be sent to the device to be tested from the test board controller. The test board address belongs to the address list added by the control terminal device. One device to be tested corresponds to a single test board address.

In step S63, ranging times are set. Due to multiple times of ranging, the influence of distance measurement variation in the results can be eliminated. In the example, to also take the testing time into account, the ranging times are set to 20 times. In step S64, the RCM is received. The RCM carries the communication time slot corresponding to the test board address where the device to be tested is placed, e.g., in a device-receiving receptacle or holder, and the device to be tested will know its specified communication time slot after receiving the RCM.

In step S65, the RIM is received. The RIM is a first ranging message in the test request signal message sent from the control terminal device. In step S66, after the RIM is received, the RRM is sent to the control terminal device within a specified interval time in the RCM. The RRM is a second ranging message in the test request signal message sent from the control terminal device. In step S67, the RFM is received. The RFM is a third ranging message in the test request signal message sent from the control terminal device.

In step S68, the MRM is received. The MRM contains time differences of sending and response of three ranging messages calculated by the control terminal device. After the MRM is received, in step S69, in accordance with time difference between control terminal device sending and receiving the response carried in the MRM, a ToF value is calculated with the combination of time difference recorded at the terminal. A value representing the distance between the device to be tested and the control terminal device is reckoned by the ToF value.

After current ranging is completed, in step S70, whether current ranging times meet a set total ranging time is determined. If the current ranging times meet the set total ranging time, step S71 is implemented. If the current ranging times do not meet the set total ranging time, the method returns to step S64 to repeat the ranging process. After all ranging is completed, in step S71, an average value of distances obtained in each ranging instance is calculated, and the average value is taken as a final ranging result. Exemplarily, the average value of the distance measurements taken over 20 instances of ranging is determined. In step S72, the testing result is determined based on the ranging result and the distance threshold. In the example, the testing result and the ranging result can be output on a test board display device.

Based on the same idea, examples of the disclosure further provides a control terminal device. It can be understood that the control terminal device provided by examples of the disclosure contains corresponding hardware structures and/or software modules to perform respective functions to implement the testing process. In combination with units and algorithmic steps of each example disclosed in examples of the disclosure, examples of the disclosure can be implemented in the form of hardware or a combination of hardware and computer software. Whether a function is implemented by means of hardware or computer software driving hardware depends on specific applications and design constraints of the technical solution. A person skilled in the art may use a different method for each particular application to achieve the functions, but such implementation shall not be considered outside the scope of the technical solutions provided by the examples of the disclosure.

Examples of the disclosure provide a control terminal device including: a first sending unit configured to send a test request signal message to multiple devices to be tested. The test request signal message includes a communication time slot distributed by the control terminal device for multiple devices to be tested, and communication time slots of different devices to be tested are different. The terminal device further includes a first receiving unit, configured to receive a response signal message returned from the multiple devices to be tested in respective corresponding communication time slots. The response signal message is configured for UWB ranging performance testing.

In an implementation mode, the first sending unit is configured to determine multiple test board addresses for holding the devices to be tested, and to create a corresponding relationship between the test board address and the communication time slot, such that different test board addresses correspond to different communication time slots; and to send the test request signal message including the corresponding relationship, to the device to be tested, wherein the device to be tested has been placed on the test board and has received input that configures the device to have the test board address corresponding to its placement.

In an implementation mode, the first sending unit is configured to broadcast the test request signal message to multiple devices to be tested. In an implementation mode, the test request signal message includes: a ranging control message, a ranging initiation message, a ranging final message and a ranging report message. The ranging control message includes communication time slots distributed for multiple devices to be tested.

In an implementation mode, the control terminal device further includes: a first testing result unit configured to, based on the response signal message, determine a distance between the device to be tested and the control terminal device. Based on the distance between the device to be tested, the control terminal device, and a distance threshold, a testing result is determined.

Based on the same inventive concept, the disclosure provides a device to be tested including a second receiving unit configured to receive a test request signal message. The test request signal message includes a communication time slot distributed by the control terminal device for the multiple devices to be tested, wherein different devices to be tested have different communication time slots. The device further includes a determining unit configured to, based on the test request signal message, determine a communication time slot for a current device to be tested to return a test response signal message to the control terminal device. The test response signal message is used for UWB ranging performance testing. The device further includes a second sending unit configured to, in accordance with the communication time slot for the current device to be tested, return the test response signal message to the control terminal device, and to send the test response signal message to the control terminal device.

In one example mode of implementation, the test request signal message indicates a corresponding relationship between a test board address and a communication time slot. The determining unit is configured to determine a test board address corresponding to a position on the test board at which the current device to be tested is placed. Based on the corresponding relationship, determining unit is configured to determine a communication time slot corresponding to the test board address, which corresponds to the position on the test board at which the current device to be tested is placed. The determining unit is further configured to take the communication time slot corresponding to the test board address as a communication time slot for feeding back the test response signal message to the control terminal device.

In another example of a mode of implementation, the device to be tested further includes a second testing result unit configured to, based on a measurement report message in the test request signal message, determine a distance between the current device to be tested and the control terminal device. Based on the distance between the current device to be tested and the control terminal device, and on a distance threshold, the device determines a testing result.

With regard to the devices in the above examples, the specific manner in which the various modules perform their operations have been described in detail above in the examples relating to the corresponding methods, and these details are not repeated in this section of the description.

Figure 12:
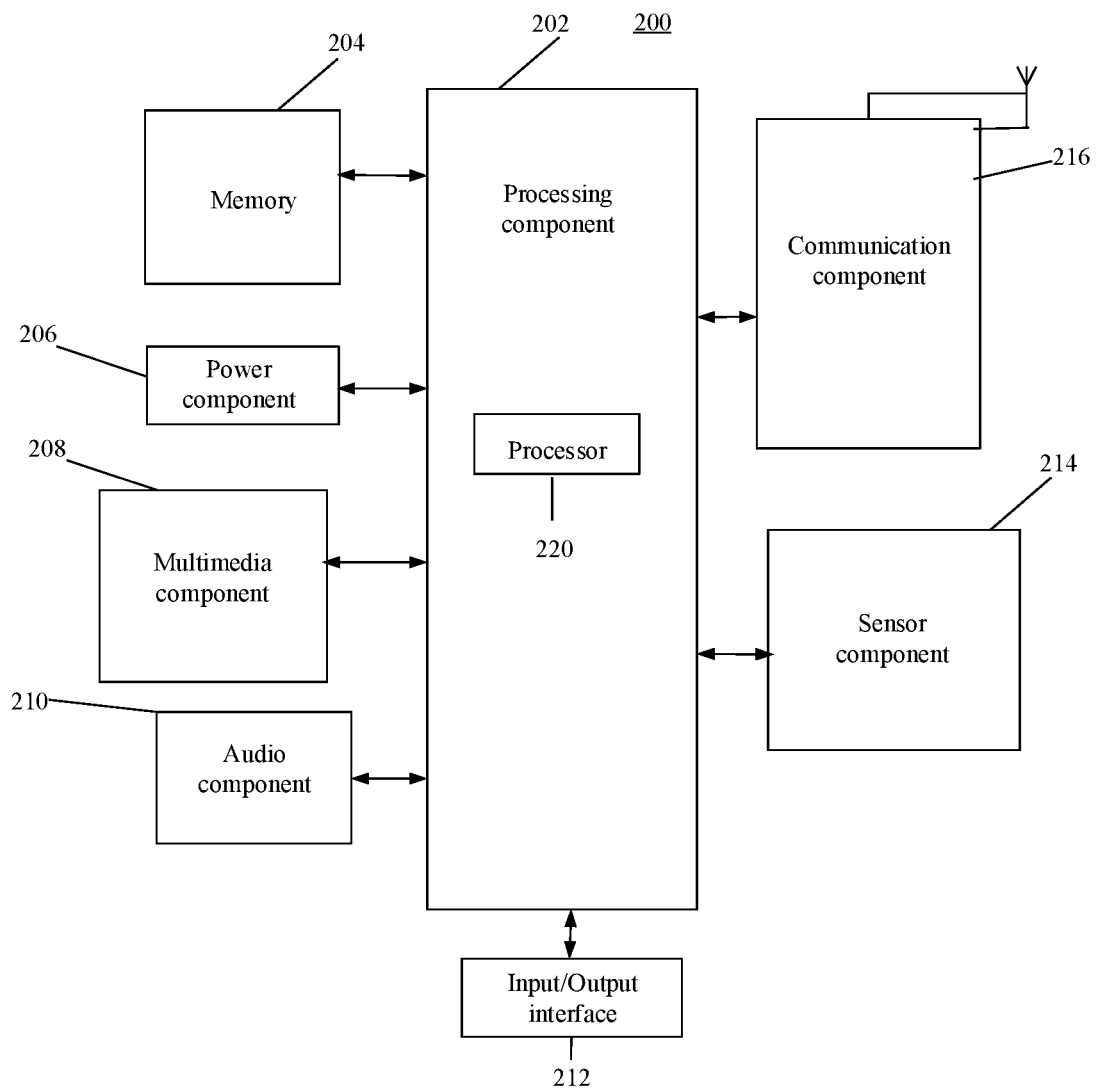
FIG. 12 is a block diagram of an electronic device according to an exemplary example.

FIG. 12 is a block diagram of an electronic device according to an example. In this example, the electronic device 200 may be a mobile phone, a computer, a digital broadcasting terminal, a messaging device, a game control, a tablet device, a medical device, a fitness device, a personal digital assistant, etc. Referring to FIG. 12, the electronic device 200 may include one or more of the following components: a processing component 202, a memory 204, a power component 206, a multimedia component 208, an audio component 210, an input/output (I/O) interface 212, a sensor component 214, and a communication component 216.

The processing component 202 usually controls the overall operations of an apparatus 200, such as operations associated with display, telephone call, data communication, camera operation and recording operation. The processing component 202 may include one or more processors 220 to execute instructions to complete all of or part of the steps of the above method, or to configure the various units to perform their described corresponding functions. In addition, the processing component 202 may include one or more modules to facilitate the interaction between the processing component 202 and other components. For example, the processing component 202 may include a multimedia module to facilitate interaction between the multimedia component 208 and the processing component 202.

The memory 204 is configured to store various types of data to support operations at the apparatus 200. Examples of these data include instructions for any application or method operated on the apparatus 200, contact data, phone book data, messages, pictures, videos, etc. The memory 204 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 206 supplies power to various components of the apparatus 200. The power component 206 may include a power management system, one or more power sources, and other components associated with power generation, management and distribution of the apparatus 200.

The multimedia component 208 includes a screen for providing an output interface between the apparatus 200 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 208 includes a front camera and/or a rear camera. When the apparatus 200 is in an operation mode, such as a shooting mode or a video mode, the front camera and/or the rear camera can receive external multimedia data. Each front or rear camera may be a fixed optical lens system or have focal length and optical zoom capability.

The audio component 210 is configured to output and/or input audio signals. For example, the audio component 210 includes a microphone (MIC), and when the apparatus 200 is in an operation mode, such as a call mode, a recording mode and a voice recognition mode, the microphone is configured to receive external audio signals. The received audio signals may be further stored in the memory 204 or sent by the communication component 216. In some examples, the audio component 210 further includes a speaker for outputting audio signals.

The I/O interface 212 provides an interface between the processing component 202 and a peripheral interface module. The peripheral interface module may be a keyboard, a click wheel, buttons, etc. These buttons may include, but are not limited to a home button, a volume button, a start button and a lock button.

The sensor component 214 includes one or more sensors for providing various aspects of status assessment for the apparatus 200. For example, the sensor component 214 may detect the on/off state of the apparatus 200, and relative positions of components such as a display and a keypad of the apparatus 200. The sensor component 214 may also detect a position change of the apparatus 200 or one component of the apparatus 200, presence or absence of contact between the user and the apparatus 200, an orientation or acceleration/deceleration of the apparatus 200 and a temperature change of the apparatus 200. The sensor component 214 may include a proximity sensor configured to detect the presence of nearby objects without any physical contact. The sensor component 214 may also include an optical sensor, such as a CMOS or CCD image sensor, for use in imaging applications. In some examples, the sensor component 214 may also include an acceleration sensor, a gyroscope sensor, a magnetic sensor, a pressure sensor or a temperature sensor.

The communication component 216 is configured to facilitate wired or wireless communication between the apparatus 200 and other devices. The apparatus 200 may access a wireless network based on communication standards, such as WiFi, 4G or 5G, or a combination thereof. In an exemplary example, the communication component 216 receives broadcast signals or broadcast associated information from an external broadcast management system via a broadcast channel. In an exemplary example, the communication component 216 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an exemplary example, the apparatus 200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an exemplary example, a non-transitory computer-readable storage medium including instructions is further provided, such as a memory 204 including instructions executable by the processor 220 of the apparatus 200 to complete the above method. For example, the non-temporary computer-readable storage medium may be an ROM, a random access memory (RAM), a CD-ROM, a magnetic tape, a floppy disk, an optical data storage device, etc.

It can be understood that "multiple" in the disclosure refers to two or more than two, and that other quantifiers are similar. "And/or", which describes the association relationship between associated objects, indicates that three relationships can exist, for example, A and/or B, which can indicate the following three cases: A alone, both A and B, and B alone. The character "/" generally indicates an "or" relationship between former and later associated objects. Singular forms "a", "said" and "the" are also intended to include most forms, unless the context clearly indicates otherwise.

It is further understood that terms "first", "second", etc. are used to describe a variety of information, but such information should not be limited to these terms. These terms are used only to distinguish the same type of information from one another and do not indicate a particular order or level of importance. In fact, expressions "first" and "second" can be used interchangeably. For example, without departing from the scope of the disclosure, the first information may also be referred to as second information, and similarly, the second information may also be referred to as first information.

It is further understood that unless otherwise specified, "connection" includes a direct connection between two without the presence of other components, as well as an indirect connection between the two with the presence of other components.

It is further understood that although the operations are depicted in a particular order in the figures in examples of the disclosure, this shall not be construed as requiring that the operations be performed in a particular order shown or in serial order, or that all of the operations shown be performed to obtain desired results. In a specific environment, multitasking and parallel processing may be advantageous.

A person skilled in the art would readily conceive of other examples of the disclosure after considering the specification and practicing the invention disclosed herein. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The specification and examples are considered exemplary only, and the true scope and spirit of the disclosure are indicated by the following scope of rights.

It should be understood that the disclosure is not limited to the precise structure described above and shown in the figures, and various modifications and changes can be made without departing from its scope. The scope of the disclosure is confined only by the scope of the appended rights.

What is claimed is:

1. A method for Ultra Wide Band (UWB) ranging performance testing performed by a control terminal device, the method comprising:

sending a test request signal message to a plurality of devices to be tested, the test request signal message comprising a communication time slot distributed by the control terminal device to the plurality of devices to be tested, wherein communication time slots of different devices to be tested are different; and receiving in each respective corresponding communication time slot, a response signal message from each respective corresponding one of the plurality of devices to be tested, each of the response signal messages being used for UWB ranging performance testing of a corresponding device;

for each one of the plurality of devices to be tested, determining a calculated distance between the control terminal device and the plurality of devices to be tested;

determining a distance error based on the calculated distance and an actual distance between the control terminal device and the plurality of devices to be tested, wherein the actual distance of each one of the plurality of devices to be tested is known to the control terminal device; and determining whether the UWB ranging performance of the plurality of devices to be tested is acceptable, wherein sending the test request signal message to the plurality of devices to be tested comprises:

determining a plurality of test board addresses, each test board address corresponding to a position on a test board at which the corresponding device to be tested is held, creating a corresponding relationship between the test board addresses and the communication time slots, wherein different test board addresses correspond to different communication time slots, and sending the test request signal message indicating the corresponding relationship to a device to be tested at the position at which the device is placed on the test board and inputting the test board address.

2. The method according to claim 1, wherein sending the test request signal message to the plurality of devices to be tested comprises broadcasting the test request signal message to the plurality of devices to be tested.

3. The method according to claim 1, wherein sending the test request signal message to the plurality of devices to be tested, comprises broadcasting the test request signal message to the plurality of devices to be tested.

4. The method according to claim 1, wherein the test request signal message comprises: a ranging control message, a ranging initiation message, a ranging final message and a ranging report message; and wherein the ranging control message includes communication time slots to be distributed to the plurality of devices to be tested.

5. A method for Ultra Wide Band (UWB) ranging performance testing performed by a device to be tested, the method comprising:

receiving a test request signal message, the test request signal message comprising a communication time slot distributed by a control terminal device to a plurality of devices to be tested, wherein communication time slots of different devices to be tested are different;

based on the test request signal message, determining the communication time slot for a current device to be tested to return a test response signal message to the control terminal device; and sending the test response signal message to the control terminal device in accordance with a respective communication time slot for the current device to be tested, the respective communication time slot specifying a time to return the test response signal message to the control terminal device;

determining the communication time slot for the current device to be tested to return the test response signal message to the control terminal device, includes:

determining a test board address of the current device to be tested; and based on a corresponding relationship, determining the communication time slot corresponding to the test board address corresponding to a position on a test board at which the current device to be tested is placed;

wherein:

the test response signal message being used for determine a calculated distance between the current device to be tested and the control terminal device;

the calculated distance being used for determine a distance error by comparing with an actual distance between the control terminal device and the current device to be tested;

the distance error being used for determine whether the UWB ranging performance of the current device to be tested is acceptable;

the actual distance of the plurality of devices to be tested is known for the control terminal device;

the test request signal message indicates the corresponding relationship between the test board address and the communication time slot;

the communication time slot corresponding to the test board address corresponding to the position on the test board at which the current device to be tested is placed, is the communication time slot for feeding back the test response signal message to the control terminal device.

6. The method according to claim 5, wherein the method further comprises:

based on a ranging report message in the test request signal message, determining a distance between the current device to be tested and the control terminal device; and based on the distance between the current device to be tested and the control terminal device, and based on a distance threshold, determining a testing result.

7. A system for Ultra Wide Band (UWB) ranging performance testing, the system comprising:

a control terminal device; and a test board, the test board having a plurality of device-holders, each device holder configured to hold a respective one of a plurality of devices to be tested;

wherein the control terminal device is configured to:

send a test request signal message to the plurality of devices to be tested, the test request signal message comprising a plurality of communication time slots to be distributed by the control terminal device to the plurality of devices to be tested, wherein each of the plurality of communication time slots corresponds to a different time, and wherein each communication time slot is assigned to respective, corresponding one of the plurality of devices to be tested, such that each device to be tested is assigned a different time slot, for each one of the plurality of devices to be tested, determine a calculated distance between the control terminal device and the device to be tested, determine a distance error based on the calculated distance and an actual distance between the control terminal device and the device to be tested, wherein the actual distance of the plurality of devices to be tested is known for the control terminal device, determine whether the UWB ranging performance of the device to be tested is acceptable, determine a plurality of test board addresses corresponding to positions at which device-holders for holding the devices to be tested are held on the test board, create a corresponding relationship between the plurality of test board addresses and the communication time slots, such that different test board addresses correspond to different communication time slots, and send the test request t signal message comprising the corresponding relationship to the device to be tested;

wherein each of the devices to be tested:

receives the test request signal message and based on the test request signal message, determines a communication time slot in which to return a test response signal message to the control terminal device, the test response signal message being used for UWB ranging performance testing, and sends the test response signal message to the control terminal device in accordance with the communication time slot assigned; and wherein the control terminal device is configured to receive the response signal messages returned from the plurality of devices to be tested in a respective corresponding communication time slots; and wherein the devices to be tested:

determines the test board address of current placement;

based on the corresponding relationship between the test board address and the communication time slot in the test request signal message, determines the communication time slot corresponding to the test board address corresponding to a position of the current placement on the test board; and takes the communication time slot corresponding to the test board address of the current placement as the communication time slot for feeding back the test response signal message to the control terminal device.

8. An electronic device comprising:

a memory storing processor executable instructions; and one or more processors communicatively coupled to the memory;

wherein the processor-executable instructions when collectively executed by the one or more processors, cause the electronic device to act as the control terminal device and perform the method according to claim 1.

9. An electronic device comprising:

a memory storing processor executable instructions; and one or more processors communicatively coupled to the memory;

wherein the processor-executable instructions, when collectively executed by the one or more processors, cause the electronic device to act as the device to be tested and perform the method according to claim 5.

10. A non-transitory storage medium storing processor-executable instructions, the processor-executable instructions when executed by a processor of the control terminal device, cause the control terminal device to perform the method according to claim 1.

11. A non-transitory storage medium storing processor-executable instructions, the processor executable instructions when executed by a processor of the control terminal device, cause the control terminal device to perform the method according to claim 5.

* * * * *

UNITED STATES PATENT AND TRADEMARK OFFICE
CERTIFICATE OF CORRECTION

PATENT NO. : 12,342,193 B2  
APPLICATION NO. : 17/681313  
DATED : June 24, 2025  
INVENTOR(S) : Feng Wang Page 1 of 1

It is certified that error appears in the above-identified patent and that said Letters Patent is hereby corrected as shown below:

In the Specification  
In Column 5, Line 64, delete "elongate" and insert -- elongated --, therefor.  
In Column 9, Line 41, delete "the he" and insert -- the --, therefor.  
In Column 11, Line 61, delete "accordance" and insert -- in accordance --, therefor.

In the Claims  
In Column 18, Line 8, in Claim 5, delete "determine" and insert -- determining --, therefor.  
In Column 18, Line 11, in Claim 5, delete "determine" and insert -- determining --, therefor.  
In Column 18, Line 15, in Claim 5, delete "determine" and insert -- determining --, therefor.  
In Column 19, Line 6, in Claim 7, delete "request t" and insert -- request --, therefor.

Signed and Sealed this  
Nineteenth Day of August, 2025

Coke Morgan Stewart  
*Acting Director of the United States Patent and Trademark Office*